(12) United States Patent
Bergen Smith et al.

(10) Patent No.: US 12,252,321 B2
(45) Date of Patent: Mar. 18, 2025

(54) ELASTOMER CONTAINING MULTILAYER FILM AND METHOD OF MANUFACTURE

(71) Applicant: Cryovac, LLC, Charlotte, NC (US)

(72) Inventors: Angelica Bergen Smith, Charlotte, NC (US); Paul Satterwhite, Simpsonville, SC (US); John Myers, Simpsonville, SC (US); Sarah Lynn Geer, Charlotte, NC (US)

(73) Assignee: Cryovac, LLC, Charlotte, NC (US)

( * ) Notice: Subject to any disclaimer, the term of this patent is extended or adjusted under 35 U.S.C. 154(b) by 0 days.

(21) Appl. No.: 17/769,092

(22) PCT Filed: Oct. 15, 2020

(86) PCT No.: PCT/US2020/055649
§ 371 (c)(1),
(2) Date: Apr. 14, 2022

(87) PCT Pub. No.: WO2021/076678
PCT Pub. Date: Apr. 22, 2021

(65) Prior Publication Data
US 2024/0101327 A1    Mar. 28, 2024

Related U.S. Application Data

(60) Provisional application No. 62/969,726, filed on Feb. 4, 2020, provisional application No. 62/915,056, filed on Oct. 15, 2019.

(51) Int. Cl.
B65D 75/26    (2006.01)
B32B 7/12     (2006.01)
(Continued)

(52) U.S. Cl.
CPC ............. B65D 75/26 (2013.01); B32B 7/12 (2013.01); B32B 27/08 (2013.01); B32B 27/30 (2013.01);
(Continued)

(58) Field of Classification Search
CPC .......... B65D 75/26; B32B 7/12; B32B 27/08; B32B 27/30; B32B 27/32; B32B 27/34;
(Continued)

(56) References Cited

U.S. PATENT DOCUMENTS 5,534,277 A * 7/1996 Ramesh ................. B32B 27/34
                                                  426/127
5,837,358 A * 11/1998 Bauer ................... B32B 27/304
                                                  428/480

(Continued)

FOREIGN PATENT DOCUMENTS

CN    1993425      9/2010
CN    102627853    8/2012
(Continued)

OTHER PUBLICATIONS

R. J. M. Borggreve, et al., Brittle-tough transition in nylon-rubber blends: effect of rubber concentration and particle size, Jan. 16, 1987, AE Enschede, The Netherlands.
(Continued)

Primary Examiner — Derek J Battisti
(74) Attorney, Agent, or Firm — Jason R. Womer

(57) ABSTRACT

A multilayer film including at least one abuse layer. The abuse layer being a blend of one or more polyamides and an anhydride grafted or maleic anhydride grafted elastomer. Anhydride or maleic anhydride grafted elastomers include ethylene propylene diene monomer, ethylene propylene copolymer, styrene-ethylene-butylene-styrene, ethylene/ octene copolymer and blends thereof. A pouch for made
(Continued)

from the multilayer film, a method for packaging a food product with the multilayer film are also disclosed.

19 Claims, 5 Drawing Sheets

(51) Int. Cl.
*B32B 27/08* (2006.01)
*B32B 27/30* (2006.01)
*B32B 27/32* (2006.01)
*B32B 27/34* (2006.01)

(52) U.S. Cl.
CPC .............. *B32B 27/32* (2013.01); *B32B 27/34* (2013.01); *B32B 2250/02* (2013.01); *B32B 2250/03* (2013.01); *B32B 2250/05* (2013.01); *B32B 2250/24* (2013.01); *B32B 2307/31* (2013.01); *B32B 2307/406* (2013.01); *B32B 2307/7244* (2013.01); *B32B 2307/734* (2013.01); *B32B 2307/7376* (2023.05); *B32B 2439/70* (2013.01)

(58) Field of Classification Search
CPC ............ B32B 2250/02; B32B 2250/03; B32B 2250/05; B32B 2250/24
See application file for complete search history.

(56) References Cited

U.S. PATENT DOCUMENTS

| | | | |
|---|---|---|---|
| 5,846,642 | A | 12/1998 | Kimura et al. |
| 6,203,750 | B1* | 3/2001 | Ahlgren ................ B29C 48/10 |
| | | | 264/173.13 |
| 6,682,825 | B1* | 1/2004 | Kennedy ................ B65D 75/32 |
| | | | 428/517 |
| 6,773,798 | B2 | 8/2004 | Ramesh |
| 6,821,635 | B2 | 11/2004 | Sugden |
| 9,988,198 | B2 | 6/2018 | Brebion |
| 10,011,718 | B2 | 7/2018 | Adur |
| 11,285,696 | B2 | 3/2022 | Brebion et al. |
| 2001/0010846 | A1* | 8/2001 | Hofmeister ............. B29C 48/10 |
| | | | 428/35.2 |
| 2004/0166261 | A1* | 8/2004 | Pockat ................ B65D 75/002 |
| | | | 428/34.9 |
| 2004/0241482 | A1* | 12/2004 | Grah ........................ B32B 7/12 |
| | | | 53/427 |
| 2006/0142489 | A1 | 6/2006 | Chou et al. |
| 2006/0194892 | A1 | 8/2006 | Ramesh et al. |
| 2007/0098953 | A1* | 5/2007 | Stabelfeldt .............. A61F 13/60 |
| | | | 428/100 |
| 2007/0213475 | A1 | 9/2007 | Bushelman |
| 2008/0292821 | A1* | 11/2008 | Dayrit ................... B29C 65/405 |
| | | | 53/442 |
| 2011/0195259 | A1* | 8/2011 | Song ..................... B32B 27/205 |
| | | | 524/265 |
| 2016/0002420 | A1 | 1/2016 | Miyaguchi |
| 2016/0185085 | A1* | 6/2016 | Spigaroli .............. B32B 27/306 |
| | | | 525/88 |
| 2017/0348950 | A1* | 12/2017 | Parkinson ............... B32B 27/32 |
| 2018/0265658 | A1 | 9/2018 | Miyaguchi |
| 2019/0085200 | A1 | 3/2019 | Jordan et al. |
| 2020/0039173 | A1* | 2/2020 | Brebion ..................... B32B 1/08 |

FOREIGN PATENT DOCUMENTS

| | | |
|---|---|---|
| CN | 105482042 | 4/2016 |
| CN | 107652670 | 2/2018 |
| CN | 108081720 | 5/2018 |
| CN | 110001167 | 7/2019 |
| EP | 0377511 | 7/1990 |
| EP | 219973 | 7/1993 |
| JP | 3172137 | 6/2001 |
| JP | 2006198977 | 8/2006 |
| WO | 2005018891 | 3/2005 |
| WO | 2019081175 | 5/2019 |

OTHER PUBLICATIONS

Xin Liu, et al., Polyamide Reinforced EPDM Compatibilized with Maleic Anhydride Grafted Ethylene-Propylene-Diene Rubber, Polymers & Polymer Composites, vol. 11, No. 3, 2003, Shanghai Jiao Tong University, Shanghai 200240, China.

* cited by examiner

ELASTOMER CONTAINING MULTILAYER FILM AND METHOD OF MANUFACTURE

BACKGROUND

The subject matter disclosed herein relates to multilayer films. More particularly, to multilayer films for food packaging.

Nylon has been added to multilayer films to improve abuse and impact properties and to resist failures and leaking during packaging and distribution of food packaging. However, even with the inclusion of nylon into the multilayer film, failures of packaging are still evident. Failures can case body, seal, and pinhole failures that lead to leaking packages. In addition, nylon may become brittle, especially in cold and dry environments, which causes the film to crack when strained.

The discussion above is merely provided for general background information and is not intended to be used as an aid in determining the scope of the claimed subject matter.

BRIEF DESCRIPTION

A multilayer film including at least one abuse layer. The abuse layer being a blend of one or more polyamides and an anhydride grafted elastomer. Anhydride grafted elastomers include ethylene propylene diene monomer, ethylene propylene copolymer, styrene-ethylene-butylene-styrene, ethylene/octene copolymer and blends thereof. A pouch for made from the multilayer film, a method for packaging a food product with the multilayer film are also disclosed.

An advantage that may be realized in the practice of some disclosed embodiments of the multilayer film are reduced impact failure.

In one exemplary embodiment, a multilayer film is disclosed. The multilayer film comprises at least one outer layer comprising at least 70% by weight of one or more of an ethylene/alpha-olefin copolymer; and at least one inner layer being an abuse layer comprising a blend of: at least 1% by weight of an anhydride grafted elastomer selected from the group consisting of ethylene propylene diene monomer, ethylene propylene copolymer, styrene-ethylene-butylene-styrene, ethylene/octene copolymer and blends thereof; and at least 25% by weight one or more polyamides; at least 5%, 10%, 20%, 30%, 40% or 50% by weight of the multilayer film being of one or more polyamides.

In another exemplary embodiment, a food package is disclosed. The food package comprises a food product; a pouch containing the food product, the pouch being made from a multilayer film comprising: at least one outer layer comprising at least 70% by weight of one or more of an ethylene/alpha-olefin copolymer; and at least one inner layer being an abuse layer comprising a blend of: at least 1% by weight of an anhydride grafted elastomer selected from the group consisting of ethylene propylene diene monomer, ethylene propylene copolymer, styrene-ethylene-butylene-styrene, ethylene/octene copolymer and blends thereof; and at least 25% by weight one or more polyamides; at least 5%, 10%, 20%, 30%, 40% or 50% by weight of the multilayer film being of one or more polyamides.

In another exemplary embodiment, a method of forming a packaged article is disclosed. The method comprises the steps of a. providing a multilayer film, the multilayer film comprising: at least one outer layer comprising at least 70% by weight of one or more of an ethylene/alpha-olefin copolymer; and at least one inner layer being an abuse layer comprising a blend of: at least 1% by weight of an anhydride grafted elastomer selected from the group consisting of ethylene propylene diene monomer, ethylene propylene copolymer, styrene-ethylene-butylene-styrene, ethylene/octene copolymer and blends thereof; and at least 25% by weight one or more polyamides; at least 5%, 10%, 20%, 30%, 40% or 50% by weight of the multilayer film being of one or more polyamides; b. forming the film into a tube in a vertical form fill and seal apparatus; c. filling the tube with a food product; and d. closing the tube to form a sealed pouch containing the food product.

In another exemplary embodiment a multilayer film is disclosed. The multilayer film comprises a first inner layer; two abuse layers disposed on opposite surfaces of the first inner layer, the two abuse layers comprising a blend of: at least 1% by weight of an anhydride grafted elastomer selected from the group consisting of ethylene propylene diene monomer, ethylene propylene copolymer, styrene-ethylene-butylene-styrene, ethylene/octene copolymer and blends thereof; and at least 25% by weight one or more polyamides; two tie layers each disposed on a surface of the respective abuse layer, each tie layer comprising an anhydride modified ethylene/alpha-olefin copolymer; two outer layers, each disposed on a surface of a respective tie layer, each outer layer comprising at least 70% by weight of one or more of an ethylene/alpha-olefin copolymer.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION

Figure 1:
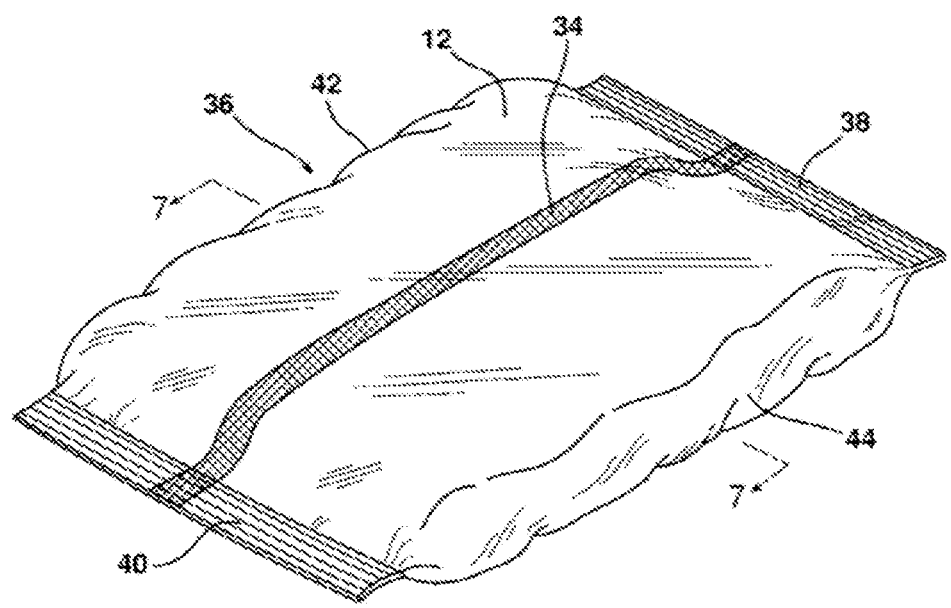
FIG. 1 is an exemplary representational peripheral view of a package according to one embodiment.
Figure 2:
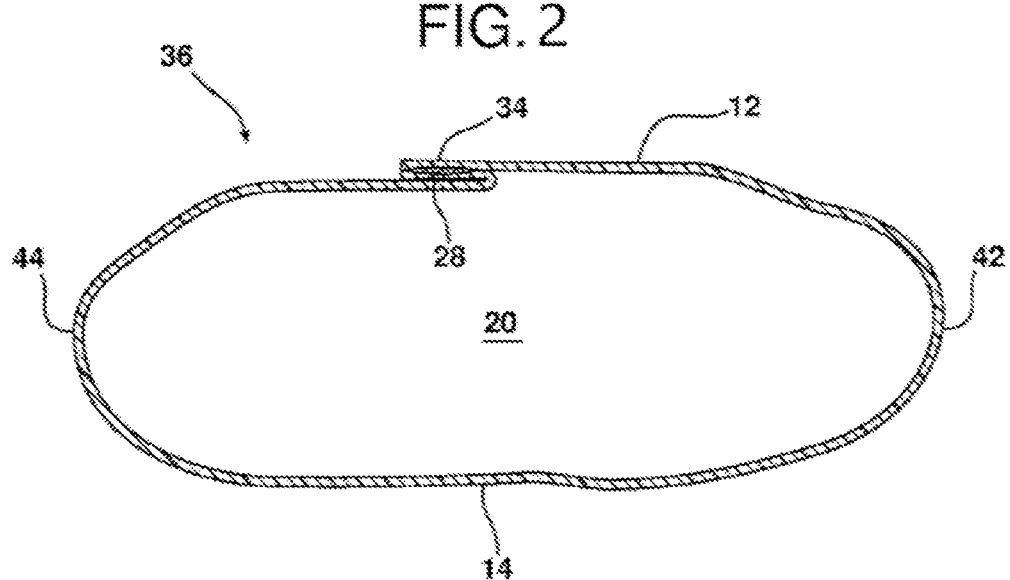
FIG. 2 is a representational cross-sectional view taken along line 7-7 of FIG. 1.
Figure 8:
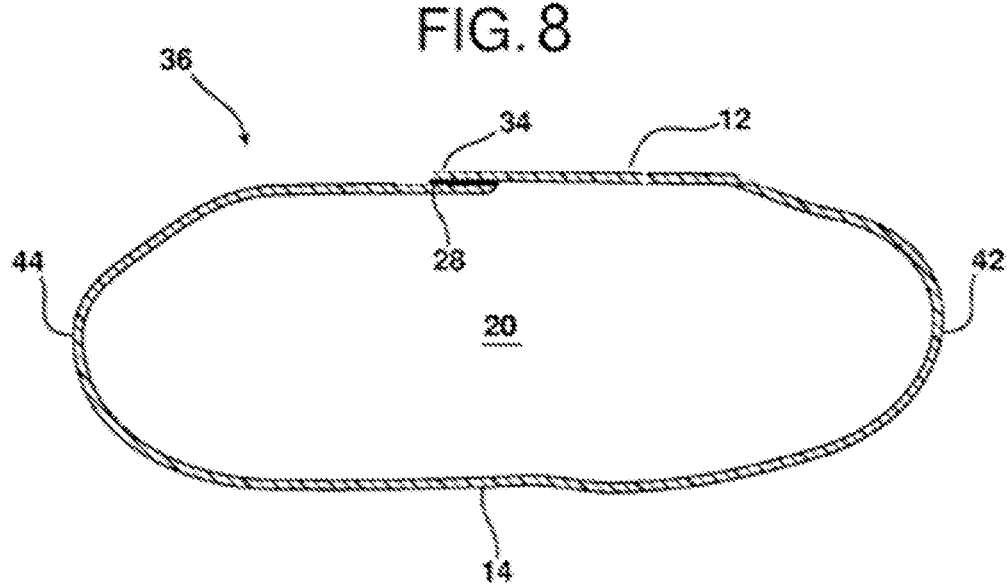
FIG. 8 is a representational cross-sectional view of a lap seal packaging according to one embodiment.

FIGS. 1-2 and 8 depict an exemplary package according to one embodiment. The web of material may be made (i.e., extruded) in a tubular shape, or supplied in a flat configuration and folded over and sealed together along a longitudinal heat seal seam 34 (e.g., a fin seal (FIG. 2) or a lap seal (FIG. 8) arrangement) to create a tubular shape, followed by heat sealing opposing ends 38, 40 to close the package 36 so that the package may have two edges 42, 44 formed by the folded over web and two edges formed by the end seals 38, to define the film upper surface 12 and the film lower surface 14.

The package 36 has heat seal 28 between and connecting the film upper surface 12 and the film lower surface 14 in selected heat seal regions 16 to enclose packaging space 20. A heat sealing operation to form heat seal 28 uses a heat sealing unit operation, such as any of thermal conductance sealing, impulse sealing, ultrasonic sealing, and dielectric sealing. For example, a heat sealing machine having a heated seal platen (i.e., bar) contacts and compresses the two films to be heat sealed together for a sufficient amount of time so that the heated seal platen transfers heat from the seal platen to soften at least a portion of the film (e.g., the sealing layers of the film) so that they may be melded together to create heat seal 28.

Figure 3:
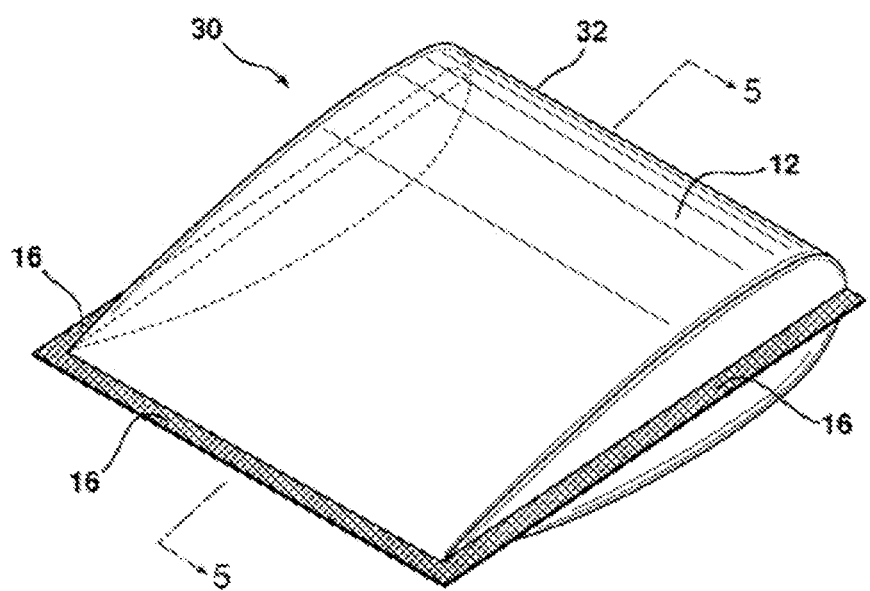
FIG. 3 is an exemplary representational peripheral view of a package according to one embodiment.
Figure 4:
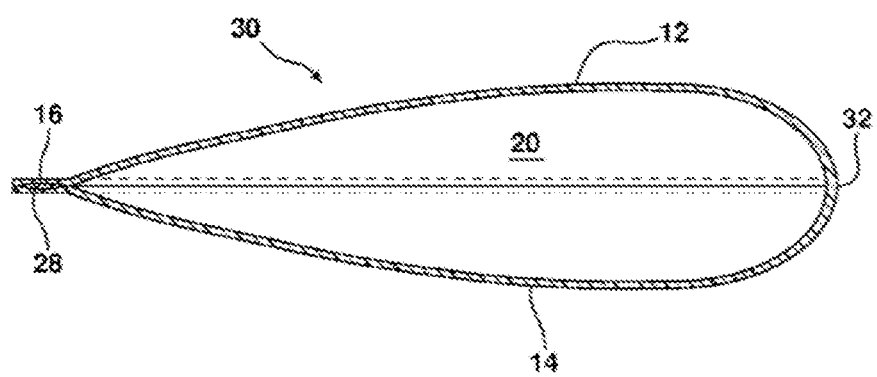
FIG. 4 is a representational cross-sectional view taken along line 5-5 of FIG. 4.

FIGS. 3-4 depict an exemplary package according to one embodiment a film is folded over and heat sealed along three edges 16 to create a closed package 30 (e.g., a pouch or bag) having heat seals along three edges and a fold edge 32 defining a fourth edge between the film upper surface 12 and the film lower surface 14. The package 30 has heat seal 28 between and connecting the film upper surface 12 and the film lower surface 14 in selected edges 16 to enclose packaging space 20. A heat sealing operation to form heat seal 28 uses a heat sealing unit operation, such as any of thermal conductance sealing, impulse sealing, ultrasonic sealing, and dielectric sealing. For example, a heat sealing machine having a heated seal platen (i.e., bar) contacts and compresses the two films to be heat sealed together for a sufficient amount of time so that the heated seal platen transfers heat from the seal platen to soften at least a portion of the film (e.g., the sealing layers of the film) so that they may be melded together to create heat seal 28.

Other exemplary packages are contemplated such as, but not limited to a top web adhered to tray, a top web adhered to a bottom web, and a lid film over a tray.

Figure 5:
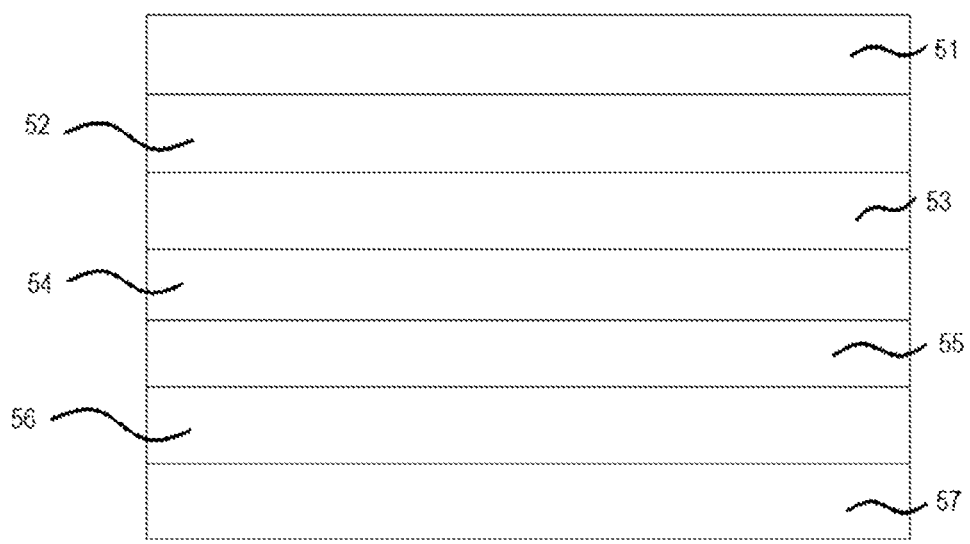
FIG. 5 is representational cross-sectional view of a multilayer film according to one embodiment.

Turning now to FIG. 5, a cross-sectional view of a multilayer film according to one embodiment is depicted. The multilayer film contains two outer layers 51, 57 which serve as heat seal layers. Tie layers 52, 56 bond the two outer layers 51, 57 to the abuse layers 53, 55 respectively. A barrier layer 54 is disposed between the two abuse layers 53 and 55. In an embodiment, additional tie layers are utilized between the barrier layer 54 and the abuse layers 53 and 55.

A layer may be an "interior layer" of a film if the layer has both surfaces directly adhered to other layers of the film. A layer may be an "outer layer" of a film if the layer forms an outer surface of the film. An "outside layer" is the outer layer of a film that is or is intended to be adjacent the space outside of a package comprising the film. An "inside layer" of a film is the outer layer of the film that is or is intended to be adjacent the space inside of a package comprising the film. A sealant layer is an outer layer of a film that is adapted to facilitate the heat-sealing of the film to itself or to another object, such as another film. A sealant layer may also be an inside layer of the film. Any of the interior, outer, outside, inside, and sealant layers may be modified layers as described herein.

"Polyethylene" as used herein refers to an ethylene homopolymer or copolymer.

Ethylene/alpha-olefin copolymers are copolymers of ethylene and one or more alpha-olefins, the copolymer having ethylene as the majority mole-percentage content. In some embodiments, the comonomer includes one or more C3-C20 alpha-olefins, e.g. C4-C12 or C4-C8 alpha-olefins. Alpha-olefins include, but are not limited to, 1-butene, 1-hexene, 1-octene, and mixtures thereof.

Ethylene/alpha-olefin copolymers include one or more of the following: 1) high density polyethylene, for example having a density greater than 0.94 g/cm$^3$, 2) medium density polyethylene, for example having a density of from 0.93 to 0.94 g/cm$^3$, 3) linear medium density polyethylene, for example having a density of from 0.926 to 0.94 g/cm$^3$, 4) low density polyethylene, for example having a density of from 0.915 to 0.939 g/cm$^3$ 5) linear low density polyethylene, for example having a density of from 0.915 to 0.935 g/cm$^3$, 6) very-low or ultra-low density polyethylene, for example having density below 0.915 g/cm$^3$, and homogeneous ethylene/alpha-olefin copolymers. Homogeneous ethylene/alpha-olefin copolymers include those having a density of less than about any of the following: 0.925, 0.922, 0.92, 0.917, 0.915, 0.912, 0.91, 0.907, 0.905, 0.903, 0.9, and 0.86 g/cm$^3$. Unless otherwise indicated, all densities herein are measured according to ASTM D1505.

In an embodiment, the multilayer film is asymmetrical. The multilayer film may have at least and/or at most 2, 3, 4, 5, 6, 7, 8, 9, 10, 11, 12, 13 layers. In an embodiment, the multilayer film utilizes microlayers. The thickness of the multilayer film may be at least, and/or at most, any of the following: 1, 1.5, 2, 4, 6, 8, 10, 12 mils. In an embodiment, each layer of the multilayer film may independently have any of at least, and/or at most, the following thicknesses: 0.25, 0.5, 1, 1.5, 2, 2.5, 3, 4, 5, 7, 8, and 10 mils.

At least one of the outer layers is a sealant layer. The sealant layer may comprise more than one polyamide such as a blend of polyamides, for example, two polyamides, at least two polyamides, three polyamides, and at least three polyamides. The sealant layer may comprise a first polyamide in any of the following amounts (based on the weight of the sealant layer): at least 40%, at least 50%, at least 60%, at least 70%, at least 80%, at least 90%, at least 95%, and the ranges between any of these forgoing values (e.g., from 60 to 80%).

The sealant layer may comprise a second polyamide in any of the following amounts (based on the weight of the sealant layer): less than 60%, less than 50%, less than 40%, less than 30%, less than 20%, less than 10%, and less than 5%, and the ranges between any of these forgoing values (e.g., from 20 to 40%).

In an embodiment, the sealant layer may comprise a third polyamide in any of the following amounts (based on the weight of the sealant layer): less than 60%, less than 50%, less than 40%, less than 30%, less than 20%, less than 10%, and less than 5%, and the ranges between any of these forgoing values (e.g., from 20 to 40%).

Each of the first, second, and third polyamides of the sealant layer may be selected from any of the polyamides or ethylene/alpha-olefin copolymers described herein, for example, low density polyethylene, linear low density polyethylene, ethylene/alpha-olefin copolymer, ethylene/butene copolymer, ethylene/hexene copolymer, ethylene/octene copolymer, ethylene/C4-8 alpha-olefin copolymer.

In an embodiment, the sealant layer has a melting point less than any of the following values: 220° C., 210° C., 200° C., 190° C., and 180° C.; and the melting point of the sealant layer may be at least any of the following values: 120° C., 130° C., 140° C., and 150° C. All references to the melting point of a polymer, a resin, or a film layer in this application refer to the melting peak temperature of the dominant melting phase of the polymer, resin, or layer as determined by differential scanning calorimetry according to ASTM D-3418.

In embodiments where the sealant layer comprises amorphous material, then the sealing layer may not clearly display a melting point. The glass transition temperature for the sealing layer may be less than, and may range between, any of the following values: 125° C., 120° C., 110° C., 100° C., 90° C., 80° C., 70° C., 60° C., and 50° C.; measured where the relative humidity may be any of the following values: 100%, 75%, 50%, 25%, and 0%. All references to the glass transition temperature of a polymer, a resin, or a film layer in this application refer to the characteristic temperature at which glassy or amorphous polymers become flexible as determined by differential scanning calorimetry (DSC) according to ASTM D-3417.

In an embodiment, the sealant layer includes a blend having one or more relatively high-melting point polyamides or ethylene/alpha-olefin copolymers with one or more relatively low-melting point polyamides or ethylene/alpha-olefin copolymers. The sealant layer may comprise such a blend in at least any of the following amounts based on the weight of the sealant layer: 70%, 80%, 90%, and 95%. The relatively high-melting point polyamides or ethylene/alpha-olefin copolymers may have a melting point of at least any of the following values: 210° C., 215° C., 220° C., 225° C., 230° C., 235° C., 240° C., 245° C., 250° C., 255° C., 260° C., 265° C., 270° C., 275° C., 280° C., 285° C., 290° C., 295° C., and 300° C.; and may range between any of the forgoing values (e.g., from 235 to 280° C.). Representative relatively high-melting point polyamides may include nylon-6, nylon-6,6, nylon-6/6,6, nylon-6,10, nylon-6,12, nylon-6/6,T, nylon-MXD,6, nylon-4,6, nylon-6,9, and nylon-6,6,/6,10 (having less than 10% or more than 60% nylon-6,6 in the copolymer).

The relatively low-melting point polyamides or ethylene/alpha-olefin copolymers may have a melting point of less than any of the following values: 210° C., 200° C., 190° C., 180° C., 170° C., 160° C., 150° C., 140° C., 130° C., 120° C., 110° C., and 100° C. Representative relatively low-melting point polyamides or ethylene/alpha-olefin copolymers may include low density polyethylene, linear low density polyethylene, ethylene/alpha-olefin copolymer, ethylene/butene copolymer, ethylene/hexene copolymer, ethylene/octene copolymer, ethylene/C4-8 alpha-olefin copolymer, nylon-6/12, nylon-12, nylon-12,T, nylon-6/6,9, nylon-11, and nylon-6,6,/6,10 (having from 10% to 60% nylon-6,6 in the copolymer).

The amount of relatively high-melting point polyamide or ethylene/alpha-olefin copolymers in the polyamide blend of relatively high-melting point polyamide or ethylene/alpha-olefin copolymers with relatively low-melting point polyamide or ethylene/alpha-olefin copolymers may be at least, may be less than, and may range between any of the following amounts (based on the weight of the blend): 1%, 5%, 10%, 10%, 20%, 30%, 40%, and 50%. The amount of relatively low-melting point polyamide or ethylene/alpha-olefin copolymers in the blend of relatively high-melting point polyamide or ethylene/alpha-olefin copolymers with relatively low-melting point polyamide or ethylene/alpha-olefin copolymers may be at least, may be less than, and may range between any of the following amounts (based on the weight of the blend): 50%, 60%, 70%, 80%, 90%, 95%, and 99%.

In an embodiment, the sealant layer may comprise a blend comprising two or more relatively low-melting point polyamides or ethylene/alpha-olefin copolymers. The sealant layer may comprise such a blend in at least any of the following amounts based on the weight of the sealant layer: 50%, 60%, 70%, 80%, 90%, and 95%.

The sealant layer may comprise one or more amorphous polyamides, for example, nylon-6,I/6,T. The sealant layer may comprise amorphous polyamide in an amount at least, at most, and ranging between any of the following values (based on the weight of the sealant layer): 20%, 30%, 40%, 50%, 60%, 70%, and 80%.

The thickness of the sealant layer may be selected to provide sufficient material to effect a strong heat seal bond, yet not so thick so as to negatively affect the characteristics of the film to an unacceptable level. The sealant layer may have a thickness of at least any of the following values: 0.05 mils, 0.1 mils, 0.15 mils, 0.2 mils, 0.25 mils, 0.3 mils, 0.35 mils, 0.4 mils, 0.45 mils, 0.5 mils, and 0.6 mils. The sealant layer may have a thickness less than any of the following values: 5 mils, 4 mils, 3 mils, 2 mils, 1 mil, 0.7 mils, 0.5 mils, and 0.3 mils. The thickness of the sealant layer as a percentage of the total thickness of the film may be less that any of the following values: 50%, 40%, 30%, 25%, 20%, 15%, 10%, and 5%; and may range between any of the forgoing values (e.g., from 10% to 30%).

A tie layer refers to an internal film layer that adheres two layers to one another. In an embodiment the tie layer includes a modified polyolefin, e.g., modified ethylene-vinyl acetate copolymer, or modified heterogeneous or homogeneous ethylene/alpha-olefin copolymer including, but not limited to anhydride grafted linear low density polyethylene, anhydride grafted low density polyethylene, anhydride grafted high density polyethylene, anhydride grafted ethylene-vinyl acetate copolymer, or modified elastomer, including anhydride grafted ethylene propylene diene monomer, anhydride grafted ethylene propylene copolymer, anhydride grafted ethylene/octene copolymer and anhydride grafted styrene-ethylene-butylene-styrene. maleic anhydride grafted linear low density polyethylene, maleic anhydride grafted low density polyethylene, maleic anhydride grafted high density polyethylene, maleic anhydride grafted ethylene-vinyl acetate copolymer, or modified elastomer, including maleic anhydride grafted ethylene propylene diene monomer, maleic anhydride grafted ethylene propylene copolymer, maleic anhydride grafted ethylene/octene copolymer and maleic anhydride grafted styrene-ethylene-butylene-styrene. In embodiments, the tie layer includes at least 0.5, 1.0, 1.5, 2.0, 2.5 or 3.0% by weight of a polymer found in adjacent layers. In an embodiment, the grafting levels of the anhydride grafted or maleic anhydride grafted polymer as less than 3 wt %.

The abuse layer is a layer of a film that can resist abrasion, puncture, and/or other potential causes of reduction of package integrity, and/or potential causes of reduction of package appearance quality. The abuse layer is a blend including a polyamide and an anhydride grafted or maleic anhydride grafted elastomer. Representative polyamides include, but are not limited to nylon 6, nylon 6/6, amorphous nylon, nylon 6,6/6, nylon 6/6,6, nylon 6/12, nylon 12, and combinations thereof. In some embodiments, abuse layers can comprise additional polymers. In embodiments, the polyamide in the abuse layer comprises 50-99%, 55-98%, 60-97%, 65-96%, 70-95% by weight of the abuse layer. In embodiments, the polyamide in the abuse layer comprises at least 50%, 55%, 60%, 65%, 70%, 75%, 80%, 85%, 90%, 95%, 96%, 97%, 98% and 99% by weight of the abuse layer. In embodiments, the polyamide comprises 55-95% by weight of the abuse layer.

In an embodiment, the anhydride grafted elastomer is a maleic anhydride grafted elastomer. The maleic anhydride grafted elastomer is selected from ethylene propylene diene monomer, ethylene propylene copolymer, styrene-ethylene-butylene-styrene, ethylene/octene copolymer and blends thereof. In embodiments, the maleic anhydride grafted elastomer in the abuse layer comprises is at least 1%, 2%, 3%, 4%, 5%, 6%, 7%, 8%, 9%, 10% by weight of the abuse layer. In embodiments, the maleic anhydride grafted elastomer in the abuse layer comprises not more than 50%, 45%, 40%, 35%, 30% by weight of the abuse layer. In embodiments, the maleic anhydride grafted elastomer in the abuse layer comprises between 1-50%, 2-40%, 3-30%, 4-20%, 5-15% by weight of the abuse layer.

The anhydride grafted or maleic anhydride grafted elastomer is dispersed through the abuse layer as discrete particles. In an embodiment, the anhydride grafted or maleic anhydride grafted elastomer are isolated and distinct spheroidal shaped particles having a mean domain size of less than 3.00, 2.50, 2.00, 1.75, 1.50, 1.25, 1.00, 0.75, or 0.50 microns. Domain size is determined by measuring the diameter of domain cross-sections in a film, either through the major or minor axis. Using stereology representative samples of a film are gathered and a statistically significant number of particles are examined. The diameter of the ellipsoid domains is determined by multiplying the mean diameter ($d_{mean}$), either through the major or minor axis, of cut domain cross-sections by $4/\pi$ as defined by the following formula:

$$\text{Domain Size} = (4/\pi) d_{mean}$$

In an embodiment the anhydride grafted or maleic anhydride grafted elastomer has a grafting level of at least 0.1 wt %. In an embodiment the anhydride grafted or maleic anhydride grafted elastomer has a grafting level between 0.1%-3.0 wt %. In an embodiment the anhydride grafted or maleic anhydride grafted elastomer has a grafting level between 0.5%-2.0 wt %.

In an embodiment the anhydride grafted or maleic anhydride grafted elastomer may be crosslinked, partially crosslinked or non-crosslinked. In an embodiment, anhydride grafted or maleic anhydride grafted elastomer is crosslinked by copolymerization of crosslinking monomers having two or more double bonds As used herein the term "elastomer" refers to a material that, at room temperature, can be stretched repeatedly (at least three times) to at least twice its original length and retract to substantially its original size. Elastomers, as the term is used herein, have a density of less than 0.920 g/cc. In an embodiment, elastomers have a density from 0.850 g/cc to 0.920 g/cc, The barrier layer includes one or more barrier components. Useful barrier components include, but are not limited to: ethylene/vinyl alcohol copolymer, polyacrylonitrile, polyvinylidene chloride, and polyamides such as, nylon-MXD,6 (either with or without nanocomposite), nylon-MXD,6/MXD,I.

The ethylene/vinyl alcohol copolymer may have an ethylene content of, for example, between 20% and 45%, between 25% and 35%, and 32% by weight. Ethylene/vinyl alcohol copolymer may include saponified or hydrolyzed ethylene/vinyl acetate copolymers, such as those having a degree of hydrolysis of at least 50%, preferably of at least 85%.

The additional layer comprising a barrier component may have a thickness and composition sufficient to impart to the film incorporating the barrier layer an oxygen transmission rate of no more than any of the following values: 150, 100, 50, 45, 40, 35, 30, 25, 20, 15, 10, and 5 cubic centimeters (at standard temperature and pressure) per square meter per day per 1 atmosphere of oxygen pressure differential measured at 0% relative humidity and 23° C. All references to oxygen transmission rate in this application are measured at these conditions according to ASTM D-3985.

An additional layer may comprise barrier component in an amount of at least any of the following: 50%, 60%, 70%, 80%, 90%, and 100%, based on the weight of the additional layer comprising the barrier component. The thickness of an additional layer may be any of the following: from 0.05 to 6 mils, from 0.05 to 4 mils, from 0.1 to 3 mils, and from 0.12 to 2 mils.

In embodiments any of the layers and/or any of the polyamide resins or blends may comprise effective amounts of one or more nucleating agents. Effective amounts and types of nucleating agents are known to those of skill in the art.

Additional layers, or the layers described herein may further include one or more additives useful in packaging films, such as, antiblocking agents, slip agents, antifog agents, colorants, pigments, dyes, flavorants, antimicrobial agents, heat stabilizers, meat preservatives, antioxidants, fillers, radiation stabilizers, antistatic agents, oxygen scavengers and odor scavengers.

Polyamide

Useful polyamides include those of the type that may be formed by the polycondensation of one or more diamines with one or more diacids and/or of the type that may be formed by the polycondensation of one or more amino acids. Useful polyamides include aliphatic polyamides and aliphatic/aromatic polyamides.

Representative aliphatic diamines for making polyamides include those having the formula:

$$H_2N(CH_2)_nNH_2$$

where n has an integer value of 1 to 16. Representative examples include trimethylenediamine, tetramethylenediamine, pentamethylenediamine, hexamethylenediamine, octamethylenediamine, decamethylenediamine, dodecamethylenediamine, hexadecamethylenediamine. Representative aromatic diamines include p-phenylenediamine, 4,4'-diaminodiphenyl ether, 4,4' diaminodiphenyl sulphone, 4,4'-diaminodiphenylethane. Representative alkylated diamines include 2,2-dimethylpentamethylenediamine, 2,2,4-trimethylhexamethylenediamine, and 2,4,4 trimethylpentamethylenediamine. Representative cycloaliphatic diamines include diaminodicyclohexylmethane. Other useful diamines include heptamethylenediamine, nonamethylenediamine, and the like.

Representative diacids for making polyamides include dicarboxylic acids, which may be represented by the general formula:

HOOC—Z—COOH where Z is representative of a divalent aliphatic radical containing at least 2 carbon atoms. Representative examples include adipic acid (i.e., hexanedioic acid), sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid and terephthalic acid.

The polycondensation reaction product of one or more or the above diamines with one or more of the above diacids may form useful polyamides. Representative polyamides of the type that may be formed by the polycondensation of one or more diamines with one or more diacids include aliphatic polyamides such as poly(hexamethylene adipamide) ("nylon-6,6"), poly(hexamethylene sebacamide) ("nylon-6,10"), poly(heptamethylene pimelamide) ("nylon-7,7"), poly(octamethylene suberamide) ("nylon-8,8"), poly(hexamethylene azelamide) ("nylon-6,9"), poly(nonamethylene azelamide) ("nylon-9,9"), poly(decamethylene azelamide) ("nylon-10,9"), poly(tetramethylenediamine-co-oxalic acid) ("nylon-4,2"), the polyamide of n-dodecanedioic acid and hexamethylenediamine ("nylon-6,12"), the polyamide of dodecamethylenediamine and n-dodecanedioic acid ("nylon-12,12").

Representative aliphatic/aromatic polyamides include poly(tetramethylenediamine-co-isophthalic acid) ("nylon-4,I"), polyhexamethylene isophthalamide ("nylon-6,I"), poly(2,2,2-trimethyl hexamethylene terephthalamide), poly(m-xylylene adipamide) ("nylon-MXD,6"), poly(p-xylylene adipamide), poly(hexamethylene terephthalamide), poly(dodecamethylene terephthalamide), and polyamide-MXD,I.

Representative polyamides of the type that may be formed by the polycondensation of one or more amino acids include poly(4-aminobutyric acid) ("nylon-4"), poly(6-aminohexanoic acid) ("nylon-6" or "poly(caprolactam)"), poly(7-aminoheptanoic acid) ("nylon-7"), poly(8-aminooctanoic acid) ("nylon-8"), poly(9-aminononanoic acid) ("nylon-9"), poly(10-aminodecanoic acid) ("nylon-10"), poly(11-aminoundecanoic acid) ("nylon-11"), and poly(12-aminododecanoic acid) ("nylon-12").

Representative copolyamides include copolymers based on a combination of the monomers used to make any of the foregoing polyamides, such as, nylon-4/6, nylon-6/9, caprolactam/hexamethylene adipamide copolymer ("nylon-6,6/6"), hexamethylene adipamide/caprolactam copolymer ("nylon-6/6,6"), trimethylene adipamide/hexamethylene azelaiamide copolymer ("nylon-trimethyl 6,2/6,2"), hexamethylene adipamide-hexamethylene-azelaiamide caprolactam copolymer ("nylon-6,6/6,9/6"), hexamethylene adipamide/hexamethylene-isophthalamide ("nylon-6,6/6,I"), hexamethylene adipamide/hexamethyleneterephthalamide ("nylon-6,6/6,T"), nylon-6,T/6,I, nylon-6/MXD,T/MXD,I, nylon-6,6/6,10, and nylon-6,I/6,T.

The term "copolymer" as used in this application means a polymer derived from two or more types of monomers, and includes terpolymers, etc. Conventional nomenclature typically lists the major constituent of a copolymer before the slash ("/") in the name of a copolymer; however, in this application the constituent listed before the slash is not necessarily the major constituent unless specifically identified as such. For example, unless the application specifically notes to the contrary, "nylon-6/6,6" and "nylon-6,6/6" may be considered as referring to the same type of copolyamide.

Polyamide copolymers may include the most prevalent polymer unit in the copolymer (e.g., hexamethylene adipamide as a polymer unit in the copolymer nylon-6,6/6) in mole percentages ranging from any of the following: at least 50%, at least 60%, at least 70%, at least 80%, and at least 90%, and the ranges between any of the forgoing values (e.g., from 60 to 80%); and may include the second most prevalent polymer unit in the copolymer (e.g., caprolactam as a polymer unit in the copolymer nylon-6,6/6) in mole percentages ranging from any of the following: less than 50%, less than 40%, less than 30%, less than 20%, less than 10%, and the ranges between any of the forgoing values (e.g., from 20 to 40%).

Useful polyamides include those that are approved by the controlling regulating agency (e.g., the U.S. Food and Drug Agency) for either direct contact with food and/or for use in a food packaging film, at the desired conditions of use.

The film may have a gloss (i.e., specular gloss) as measured against the outside layer of at least about, and/or at most about, any of the following values: 40, 50, 60, 63, 65%, 70, 75, 80, 85, 90, and 95. These numbers represent the ratio of light reflected from the sample to the original amount of light striking the sample at the designated angle. All references to "gloss" values in this application are in accordance with ASTM D 2457 (45° angle), which is incorporated herein in its entirety by reference.

Haze is a measurement of the transmitted light scattered more than 2.5° from the axis of the incident light. Haze is measured against the outside surface of the film according to the method of ASTM D 1003, which is incorporated herein in its entirety by reference. All references to "haze" values in this application are by this standard. The haze of the film may be not higher than any of the following values: 20%, 15%, 10%, 9%, 8%, 7%, 6%, 5%, 4%, 3%, and 1%. Any of the first and/or second films may have any of these haze values after a representative sample of the film is placed for two hours in a conventional oven having an air temperature of 204.4° C.

The first and/or second films may be transparent (at least in the non-printed regions) so that the packaged article is visible through the film. "Transparent" as used herein means that the material transmits incident light with negligible scattering and little absorption, enabling objects (e.g., packaged food or print) to be seen clearly through the material under typical unaided viewing conditions (i.e., the expected use conditions of the material). The transparency (i.e., clarity) of the film may be at least any of the following values: 20%, 25%, 30%, 40%, 50%, 65%, 70%, 75%, 80%, 85%, and 95%, as measured in accordance with ASTM D1746. All references to "transparency" values in this application are by this standard.

Any of the first and/or second films may have a heat-shrinkable attribute. For example, the film may have a free shrink in at least one direction (i.e., machine or transverse direction) or in at least each of two directions (machine and transverse directions) measured at 104.4° C. of at least any of the following: 3%, 7%, 10%, 15%, 20%, 25%, 30%, 40%, 50%, 55%, 60%, and 65%. Further, the films may have any of a free shrink in at least one direction (machine or transverse direction) or in at least each of two directions (machine and transverse directions) of at least any of these listed shrink values when measured at any of 37.8° C., 48.9° C., 60.0° C., 71.1° C., 85.0° C., 87.8° C., 93.3° C., and 98.9° C. Unless otherwise indicated, each reference to free shrink in this application means a free shrink determined by measuring the percent dimensional change in a 10 cm×10 cm specimen when subjected to selected heat (i.e., at a certain temperature exposure) according to ASTM D-2732.

The multilayer film may be manufactured by thermoplastic film-forming processes known in the art (e.g., tubular or blown-film extrusion, coextrusion, extrusion coating, flat cast extrusion, annular cast extrusion). A combination of these processes may also be employed. For example, the film may be made using any of a "double bubble" or "triple bubble" extrusion processes.

In embodiments, the multilayer film may be oriented or non-oriented. The film may be oriented in either the machine (i.e., longitudinal) or the transverse direction, or in both directions (i.e., biaxially oriented), for example, in order to enhance the optics, strength, and durability of the film. For example, the film may be oriented in one of the machine or transverse directions or in both of these directions by at least any of the following ratios: 2:1, 2.5:1, 2.7:1, 3:1, 3.5:1, and 4:1. The film may be oriented in one of the machine or transverse directions or in both of these directions by no more than any of the following ratios: 10:1, 9:1, 8:1, 7:1, 6:1, 5:1, and 4:1. If the film is oriented, then it may be heat set or annealed after orientation to reduce the heat shrink attribute to a desired level or to help obtain a desired crystalline state of the film. For example, the first and/or second films may be made using a tenterframe process.

In embodiments the multilayer film is partially or wholly cross-linked. To produce cross-linking a film, layer or layers of the film are treated with a suitable radiation dosage of high-energy electrons. In embodiments an electron accelerator introduces the radiation dosage, with a dosage level being determined by standard dosimetry methods. It is understood that other accelerators, such as a Van der Graaf generator or resonating transformer may be used. The radiation is not limited to electrons from an accelerator since any ionizing radiation may be used. In embodiments the radiation dosage of high energy electrons is up to 140 kGreys, in the range of from 10 to 120 kGreys, in the range of from 20 to 100, or in the range of from 30 to 80 kGreys. In an embodiment irradiation is performed prior to orientation. In an embodiment irradiation is performed after orientation.

Figure 6:
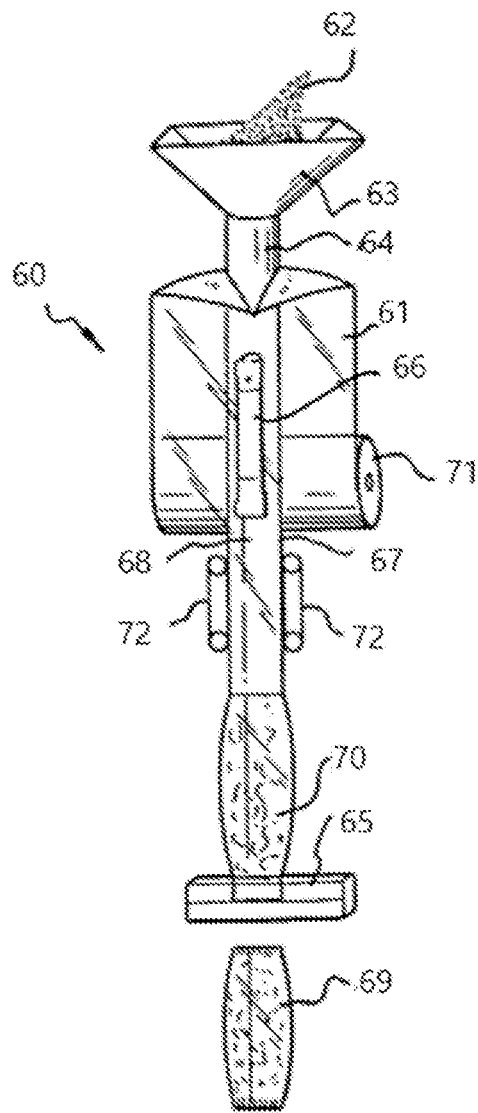
FIG. 6 is a representational view of a vertical form fill and seal apparatus as used in exemplary packaging processes.

FIG. 6 illustrates a vertical form fill and seal apparatus to be used in packaging process according to the present invention. A vertical form fill and seal apparatus 60 is schematically illustrated. Apparatus 60 utilizes multilayer film 61 as described herein. Product 62, to be packaged, is supplied to apparatus 60 from a source (not illustrated), from which a predetermined quantity of product 62 reaches upper end portion of forming tube 64 via funnel 63, or other conventional means. The packages are formed in a lower portion of apparatus 60, and flexible sheet material 61 from which the bags or packages are formed is fed from roll 71 over certain forming bars (not illustrated), is wrapped about forming tube 64, and is provided with longitudinal seal 67 by longitudinal heat sealing device 66, resulting in the formation of vertically-sealed tube 68. End seal bars 65 operate to close and seal horizontally across the lower end of vertically-sealed tube 68, to form pouch 70 which is thereafter immediately packed with product 62. Film drive belts 72, powered and directed by rollers, as illustrated, advance vertically-sealed tube 68 and pouch 70 a predetermined distance, after which end seal bars 65 close and simultaneously seal horizontally across the lower end of vertically-sealed tube 68 as well as simultaneously sealing horizontally across upper end of sealed pouch 69, to form a product packaged in sealed pouch 69. The next pouch 70, thereabove, is then filled with a metered quantity of product 62, forwarded, and so on. It is also conventional to incorporate with the end seal bars a cut-off knife (not shown) which operates to sever a lower sealed pouch 69 from the bottom of upstream pouch 70.

In carrying out the packaging process, in an embodiment, the vertical form fill and seal machine forms, fills, and seals at least 15 packages per minute. In another embodiment, the vertical form fill and seal machine forms, fills, and seals 15 to 45 packages per minute, without substantial burn through of the film at the seals. In an embodiment, the product is a liquid containing food product, including, but not limited to macaroni and cheese, mashed potatoes, diced vegetables, diced fruit, eggs, soup, gravy, sauces, whole meat, diced meat, rice, grains, non-sauced pasta, partially cooked pasta, pasta/sauce blends, whole vegetables, fruit fillings, fruit syrups, ground meat, or combinations thereof.

Figure 7:
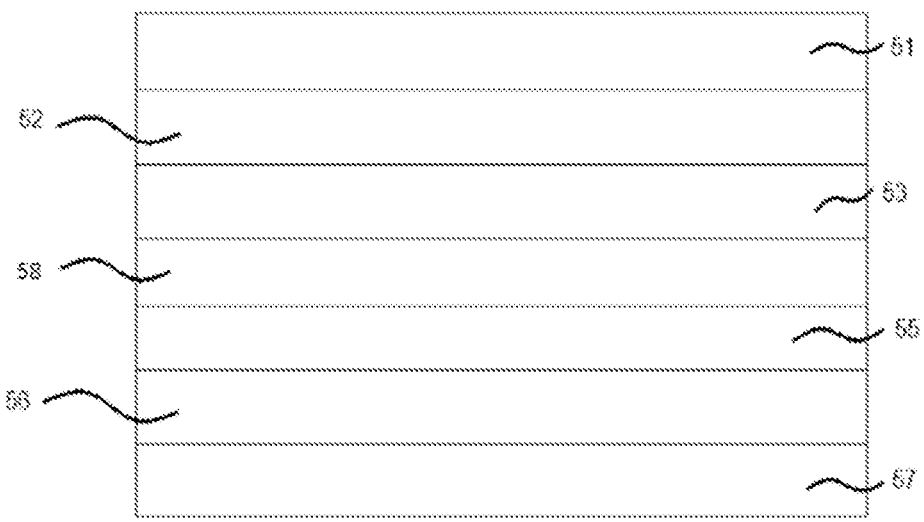
FIG. 7 is representational cross-sectional view of a multilayer film according to one embodiment.

Turning now to FIG. 7, a cross-sectional view of a multilayer film according to one embodiment is depicted. The multilayer film contains two outer layers 51, 57 which serve as heat seal layers. Tie layers 52, 56 bond the two outer layers 51, 57 to the abuse layers 53, 55 respectively. A Tie layer 58 is disposed between the two abuse layers 53 and 55. In an embodiment, additional tie layers are utilized between the barrier layer 54 and the abuse layers 53 and 55.

Examples

The following examples are presented for the purpose of further illustrating and explaining various embodiments the present invention and are not to be taken as limiting in any regard. Unless otherwise indicated, all parts and percentages are by weight.

The following abbreviations may be used:

LDPE is a low density polyethylene having a melting point of 110° C. available from ExxonMobile under the LDPE LD 102.LC trade name.

LLDPE is a linear low density polyethylene having a melting point of 114° C. available from ExxonMobile under the Exceed 4518PA trade name.

MA-LLDPE is a maleic anhydride-modified linear low density polyethylene having a melting point of 122° C. available from Westlake Chemical under the GT4408 trade name.

MA-VLDPE is a maleic anhydride-modified linear low density polyethylene having a melting point of 124° C. available from LyondellBasell under the Plexar PX3216 trade name.

MA-EOC is a maleic anhydride-modified ethylene/octene copolymer having a melting point of 52° C. available from DuPont under the Fusabond N598 trade name.

PA-6 is a nylon-6 having a melting point of 220° C. available from BASF Corporation under the Ultramid B40 trade name.

PA-6/66 is a nylon-6/66 having a melting point of 193° C. available from BASF under the Ultramid C40 trade name.

MDPE is a medium density polyethylene having a melting point of 125° C. available from Dow under the Dowlex 2037 trade name.

EVOH is an ethylene/vinyl acetate copolymer having a melting point of 187° C. available from CCP under the EV2951F trade name.

Antifogging agents are additives that prevent or reduce the condensation of fine droplets of water on a surface of a packaging film. Such additives function as mild wetting agents that exude to the surface of the packaging film, and lower the surface tension of the water, thereby causing the water to spread into a continuous film. Examples of antifog agents are a mono fatty acid derivative of glycerol (e.g. glycerol monostearate), and a polyglycerol mono fatty acid derivative (e.g. polyglycerol monostearate). The mono fatty acid derivative of glycerol, and the polyglycerol mono fatty acid derivative, can be used either singly, or in combination, as the antifog agent of the invention.

Processing aids include but are not limited to fluoropolymer in polyethylene.

Preparation of Sample Films

Films having a 4 mil thickness were made by a round cast co-extrusion process to have the compositions shown in the following tables.

Sample Film 1 (Comparative)

| Outer 70 wt % LLDPE 30 wt % LDPE | Tie 100% MA-LLDPE | Abuse 100% PA-6 | Tie 100% MA-LLDPE | Abuse 100% PA-6 | Tie 100% MA-LLDPE | Outer 70% LLDPE 30% LDPE |
|---|---|---|---|---|---|---|
| 1.44 mil | 0.28 mil | 0.48 mil | 0.4 mil | 0.48 mil | 0.28 mil | 0.64 mil |

Sample Film 2

| Outer 70 wt % LLDPE 30 wt % LDPE | Tie 100% MA-LLDPE | Abuse 85% PA-6 15% MA-EOC | Tie 100% MA-LLDPE | Abuse 85% PA-6 15% MA-EOC | Tie 100% MA-LLDPE | Outer 70% LLDPE 30% LDPE |
|---|---|---|---|---|---|---|
| 1.44 mil | 0.28 mil | 0.48 mil | 0.4 mil | 0.48 mil | 0.28 mil | 0.64 mil |

Sample Film 3

| Outer 70 wt % LLDPE 30 wt % LDPE | Tie 100% MA-LLDPE | Abuse 92% PA-6 8% MA-EOC | Tie 100% MA-LLDPE | Abuse 92% PA-6 8% MA-EOC | Tie 100% MA-LLDPE | Outer 70% LLDPE 30% LDPE |
|---|---|---|---|---|---|---|
| 1.44 mil | 0.28 mil | 0.48 mil | 0.4 mil | 0.48 mil | 0.28 mil | 0.64 mil |

Sample Film 4

| Outer 70 wt % LLDPE 30 wt % LDPE | Tie 100% MA-LLDPE | Abuse 85% PA-6 15% MA-EOC | Tie 100% MA-LLDPE | Abuse 85% PA-6 15% MA-EOC | Tie 100% MA-LLDPE | Outer 70% LLDPE 30% LDPE |
|---|---|---|---|---|---|---|
| 1.52 mil | 0.28 mil | 0.4 mil | 0.4 mil | 0.4 mil | 0.28 mil | 0.72 mil |

Sample Film 5

| Outer 70 wt % LLDPE 30 wt % LDPE | Tie 100% MA-LLDPE | Abuse 96% PA-6 4% MA-EOC | Tie 100% MA-LLDPE | Abuse 96% PA-6 4% MA-EOC | Tie 100% MA-LLDPE | Outer 70% LLDPE 30% LDPE |
|---|---|---|---|---|---|---|
| 1.52 mil | 0.28 mil | 0.4 mil | 0.4 mil | 0.4 mil | 0.28 mil | 0.72 mil |

Sample Film 6

| Outer 70 wt % LLDPE 30 wt % LDPE | Tie 100% MA-LLDPE | Abuse 92% PA-6 8% MA-EOC | Tie 100% MA-LLDPE | Abuse 92% PA-6 8% MA-EOC | Tie 100% MA-LLDPE | Outer 70% LLDPE 30% LDPE |
|---|---|---|---|---|---|---|
| 1.52 mil | 0.28 mil | 0.4 mil | 0.4 mil | 0.4 mil | 0.28 mil | 0.72 mil |

Sample film 7

| Sealant 69.75% LLDPE 25% MDPE 4% Antifogging agent 1.25% Processing aids | Tie 100% MA-VLDPE | Core 50% PA-6/66 42.5% PA-6 7.5% MA-EOC | Barrier 100% EVOH | Core 50% PA-6/66 42.5% PA-6 7.5% MA-EOC | Tie 100% MA-VLDPE | Outer 69.75% LLDPE 25% MDPE 4% Antifogging agent 1.25% Processing aids |
|---|---|---|---|---|---|---|
| 0.19 mil | 0.17 mil | 0.09 mil | 0.09 mil | 0.09 mil | 0.17 mil | 0.19 mil |

Sample film 8

| Outer 70 wt % LLDPE 30 wt % LDPE | Tie 100% MA-LLDPE | Abuse 92% PA-6 8% MA-SEBS | Tie 100% MA-LLDPE | Abuse 92% PA-6 8% MA-SEBS | Tie 100% MA-LLDPE | Outer 70% LLDPE 30% LDPE |
|---|---|---|---|---|---|---|
| 1.52 mil | 0.28 mil | 0.4 mil | 0.4 mil | 0.4 mil | 0.28 mil | 0.72 mil |

Sample film 9

| Outer 70 wt % LLDPE 30 wt % LDPE | Tie 100% MA-LLDPE | Abuse 92% PA-6 8% MA-EPDM | Tie 100% MA-LLDPE | Abuse 92% PA-6 8% MA-EPDM | Tie 100% MA-LLDPE | Outer 70% LLDPE 30% LDPE |
|---|---|---|---|---|---|---|
| 1.52 mil | 0.28 mil | 0.4 mil | 0.4 mil | 0.4 mil | 0.28 mil | 0.72 mil |

Sample film 10

| Outer 70 wt % LLDPE 30 wt % LDPE | Tie 100% MA-LLDPE | Abuse 92% PA-6 8% MA-EP | Tie 100% MA-LLDPE | Abuse 92% PA-6 8% MA-EP | Tie 100% MA-LLDPE | Outer 70% LLDPE 30% LDPE |
|---|---|---|---|---|---|---|
| 1.52 mil | 0.28 mil | 0.4 mil | 0.4 mil | 0.4 mil | 0.28 mil | 0.72 mil |

Impact Testing

Sample Films 1-6 were tested according to ASTM D3763-08 to gauge the performance of the films at impact velocities and the rate sensitivity to impact. The tests were conducted at least one week after manufacture of the films. The results are set forth in Table A below.

TABLE A

| Sample Film | Peak Load (N) | |
|---|---|---|
| | 23° C. | 0° C. |
| 1 | 114 ± 10 | 98 ± 6 |
| 2 | 119 ± 15 | 95 ± 20 |
| 3 | 118 ± 8 | 98 ± 15 |
| 4 | 106 ± 7 | 92 ± 6 |
| 5 | 109 ± 11 | 104 ± 4 |
| 6 | 110 ± 5 | 91 ± 12 |
| 8 | 119 ± 6 | 97 ± 2 |
| 9 | 114 ± 5 | 98 ± 4 |
| 10 | 90 ± 10 | 85 ± 5 |

Preparation of Packages

Sample Film 1-6 were made into pouches using an Onpack 3002 vertical form fill and seal machine. The end seal temperature was 140° C. and the time was 0.8 seconds. The end seals were five-rib seals. The center "lap" seal was 145° C. for 0.7 seconds. Each pouch had a length of 380 mm and a width of 240 mm. The pouches were filled with approximately 6 lbs of water, the water temperature being between 21 and 25.5° C. The packages were produced in a room having a temperature of 18 to 25° C. Sample Film 1 was formed into Sample Pouch 1. Sample Film 2 was formed into Sample Pouch 2. Sample Film 3 was formed into Sample Pouch 3. Sample Film 4 was formed into Sample Pouch 4. Sample Film was formed into Sample Pouch 5. Sample Film 6 was formed into Sample Pouch 6.

Immediate Drop Test

At least within 10 minutes of the creation of the water filled pouches, a "drop test" was completed for the packages using the following procedure. In a room having a temperature between 18 to 25° C., pouches were individually placed on the platform of a Lansmont Drop Tester. Pouches were placed lap seal facing up. Each pouch was dropped one time from a height of 6 ft, and the failure mode was recorded. Each pouch was hand squeeze to detect failures. If the pouch survived the fall with no damages that would cause water leakage, the drop was recorded as a "pass." If the pouch ruptured in the body of the package, which would cause a gash or hole in the film, this failure was referred to as a "body" failure. A small leak in the body of the pouch, which would cause a needle-like or pin hole, was recorded as a "pinhole" failure. A failure in the film along the base of the five-rib seal at either end of the pouch was recorded as a "seal" failure. The results from the immediate drop test are shown below in Table B.

TABLE B

| Sample Pouch | Total dropped packages | Pass | Body | Pinhole | Seal |
|---|---|---|---|---|---|
| 1 | 100 | 30 | 3 | 1 | 66 |
|  |  | 30.0% | 3.0% | 1.0% | 66.0% |
| 2 | 200 | 169 | 4 | 10 | 17 |
|  |  | 84.5% | 2.0% | 5.0% | 8.5% |
| 3 | 210 | 156 | 9 | 22 | 23 |
|  |  | 74.3% | 4.3% | 10.5% | 10.9% |
| 4 | 306 | 277 | 0 | 18 | 11 |
|  |  | 90.5% | 0% | 5.8% | 3.6% |
| 5 | 190 | 155 | 6 | 5 | 24 |
|  |  | 81.6% | 3.2% | 2.6% | 12.6% |
| 6 | 195 | 166 | 12 | 7 | 10 |
|  |  | 85.1% | 6.2% | 3.6% | 5.1% |
| 8 | 100 | 96 | 0 | 0 | 4 |
|  |  | (96.0%) |  |  | (4.0%) |
| 9 | 100 | 98 | 0 | 0 | 2 |
|  |  | (98.0%) |  |  | (2.0%) |
| 10 | 100 | 65 | 1 | 3 | 31 |
|  |  | (65.0%) | (1.0%) | (3.0%) | (31.0%) |

Free shrink tests are used to evaluate the unrestrained linear heat shrinkage of thin plastic films for packaging applications. ASTM D2732 is used to determine the free shrink. The water bath temperature used was 85° C. Readings were taken as soon as the film was produced ("in-process") and after the film had aged 7 days. The results from the heat shrinkage test are shown below in Table C.

TABLE C

| Sample film 7 | In-process | Aged 7 days |
|---|---|---|
| Longitudinal | 14% | 13.5% |
| Transverse | 5.3% | 8.75% |

Appearance characteristics of Film 1-6 are shown below in Table D.

TABLE D

| Sample | Transmission (%) | Haze (%) | Gloss |
|---|---|---|---|
| 1 | 93.0 | 7.8 | 96.3 |
| 2 | 92.2 | 9.3 | 90.2 |
| 3 | 91.8 | 11.4 | 91.8 |
| 4 | 92.4 | 10.0 | 96.3 |
| 5 | 92.8 | 9.5 | 95.0 |
| 6 | 92.4 | 9.9 | 93.5 |
| 8 | 93.7 | 9.5 | 76.0 |
| 9 | 91.9 | 11.8 | 73.0 |
| 10 | 91.2 | 13.3 | 70.4 |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

PARTS LIST

12—Film upper surface
14—Film lower surface
16—Edges
20—Packaging space
28—Heat seal
30—Package
32—Fold edge
34—Heat seal seam
36—Package
38—End seal
40—End seal
42—Edge
44—Edge
51—Outer layer
52—Tie layer
53—Abuse layer
54—Barrier layer
55—Abuse layer
56—Tie layer
57—Outer layer
58—Tie layer
60—Apparatus
61—Multilayer film
62—Product
63—Funnel
64—Forming tube
65—End seal bars
66—Heat sealing device
67—Longitudinal seal
68—Vertically-sealed tube
69—Pouch
70—Pouch
71—Roll
72—Film drive belts

What is claimed is:

1. A multilayer film comprising:
   at least one outer layer comprising at least 70% by weight of one or more of an ethylene/alpha-olefin copolymer;
   and at least one inner layer being an abuse layer comprising a blend of:
      at least 1% by weight of an anhydride grafted elastomer selected from the group consisting of ethylene propylene diene monomer, ethylene propylene copolymer, styrene-ethylene-butylene-styrene, ethylene/octene copolymer and blends thereof, the anhydride grafted elastomer having a grafting level between 0.1-3.0 wt %; and
   at least 25% by weight one or more polyamides;
   wherein at least 5%, 10%, 20%, 30%, 40% or 50% by weight of the multilayer film being of one or more polyamides; the multilayer film having a haze measured according to ASTM D1003 not higher than 20%, and/or a gloss measured according to ASTM D 2457 of at least 90.

2. The multilayer film according to claim 1 wherein the outer layer is a sealant layer comprising at least 50% by weight of a linear low density polyethylene.

3. The multilayer film according to claim 2, wherein the linear low density polyethylene of the outer layer comprises a blend of a linear low density ethylene/hexene copolymer and a linear low density ethylene/octene copolymer.

4. The multilayer film according to claim 1, wherein the abuse layer comprises at least 3% of an anhydride grafted elastomer selected from the group consisting of ethylene propylene diene monomer, ethylene propylene copolymer, styrene-ethylene-butylene-styrene, ethylene/octene copolymer and blends thereof.

5. The multilayer film according to claim 1, wherein the abuse layer comprises at least 5% of an anhydride grafted elastomer selected from the group consisting of ethylene propylene diene monomer, ethylene propylene copolymer, styrene-ethylene-butylene-styrene, ethylene/octene copolymer and blends thereof.

6. The multilayer film according to claim 1, wherein the anhydride grafted elastomer of the abuse layer is maleic anhydride grafted ethylene/octene copolymer.

7. The multilayer film according to claim 1, wherein the multilayer film further comprises and inner layer being a barrier layer disposed between the outer layer and the abuse layer, the multilayer film have an oxygen transmission rate of no more than 150 cubic centimeters (at standard temperature and pressure) per square meter per day per 1 atmosphere of oxygen pressure differential measured at 0% relative humidity and 23° C. as measured according to ASTM D-3985.

8. The multilayer film according to claim 7 wherein the barrier layer comprises at least 50% be weight ethylene/vinyl alcohol copolymer or polyvinylidene chloride.

9. The multilayer film according to claim 1, wherein the one or more polyamides of the abuse layer is selected from the group consisting of nylon-6,6; nylon-6,10; nylon-7,7; nylon-8,8; nylon-6,9; nylon-9,9; nylon-10,9; nylon-4,2; nylon-6,12; nylon-12,12; nylon-4,I; nylon-6,I; poly(2,2,2-trimethyl hexamethylene terephthalamide), nylon-MXD,6; poly(p-xylylene adipamide); poly(hexamethylene terephthalamide); poly(dodecamethylene terephthalamide); polyamide-MXD,I; nylon-4; nylon-6; nylon-7; nylon-8; nylon-9; nylon-10; nylon-11; nylon-12; nylon-4/6; nylon-6/9; nylon-6,6/6; nylon-6/6,6; nylon-trimethyl 6,2/6,2; nylon-6,6/6,9/6; nylon-6,6/6,I; nylon-6,6/6, T; nylon-6, T/6,I; nylon-6/MXD, T/MXD,I; nylon-6,6/6,10; nylon-6,I/6, T; and blends thereof.

10. The multilayer film according to claim 1, wherein the one or more polyamides of the abuse layer is selected from the group consisting of nylon-4; nylon-6; nylon-7; nylon-8; and blends thereof.

11. The multilayer film according to claim 1, wherein the one or more polyamides of the abuse layer comprises at least 50%, or at least 70% by weight of nylon-4; nylon-6; nylon-7; nylon-8; and blends thereof.

12. The multilayer film according to claim 1, wherein the multilayer film has a free shrink of less than 30% in any directions measured in accordance with ASTM D 2732.

13. The multilayer film according to claim 1 further comprising a tie layer disposed between the outer layer and the abuse layer, the tie layer comprising at least 80% by weight of a maleic anhydride grafted linear low density polyethylene.

14. The multilayer film according to claim 1, wherein the multilayer film has a total thickness of not more than 12, 10, 8, 6, 4, 1.5 or 1 mils.

15. The multilayer film according to claim 1, wherein the anhydride grafted elastomer is dispersed in the abuse layer as distinct spheroidal shaped particles having a mean domain size of less than 3.00 microns according to the formula:

Domain size=(4/π)$d$mean diameter is measured by taking mean diameter (dmean) of the domains across either the major or minor axis.

16. The multilayer film according to claim 1, wherein the multilayer film comprises:
  i. the at least one outer layer being a first outer layer comprising a blend of a linear low density polyethylene and a low density polyethylene;
  ii. a first tie layer directly adhered to the at least one outer layer on one side and the abuse layer on the other side, the first tie layer comprising a maleic anhydride modified linear low density polyethylene;
  iii. an inner layer directly adhered to the abuse layer on one side a second abuse layer on the other side;
  iv. the second abuse layer comprising a blend of:
    at least 1% by weight of a maleic anhydride grafted elastomer selected from the group consisting of ethylene propylene diene monomer, ethylene propylene copolymer, styrene-ethylene-butylene-styrene, ethylene/octene copolymer and blends thereof; and
    at least 25% by weight one or more polyamides;
  v. a second tie layer directly adhered to the second abuse layer on one side and a second outer layer on the other side, the second tie layer comprising a maleic anhydride modified linear low density polyethylene; and
  vi. the second outer layer comprising a blend of a linear low density polyethylene and a low density polyethylene.

17. A food package comprising:
  a food product;
  a pouch containing the food product, the pouch being made from a multilayer film comprising:
    at least one outer layer comprising at least 70% by weight of one or more of an ethylene/alpha-olefin copolymer;
  and at least one inner layer being an abuse layer comprising a blend of:
    at least 1% by weight of an anhydride grafted elastomer selected from the group consisting of ethylene propylene diene monomer, ethylene propylene copolymer, styrene-ethylene-butylene-styrene, ethylene/octene copolymer and blends thereof, the anhydride grafted elastomer having a grafting level between 0.1-3.0 wt %; and
  at least 25% by weight one or more polyamides;
  wherein at least 5%, 10%, 20%, 30%, 40% or 50% by weight of the multilayer film being of one or more polyamides; the multilayer film having a haze measured according to ASTM D1003 not higher than 20%, and/or a gloss measured according to ASTM D 2457 of at least 90.

18. A method of forming a packaged article comprising the steps of:
  a. providing a multilayer film, the multilayer film comprising:
    i. at least one outer layer comprising at least 70% by weight of one or more of an ethylene/alpha-olefin copolymer;
    ii. and at least one inner layer being an abuse layer comprising a blend of:
    at least 1% by weight of an anhydride grafted elastomer selected from the group consisting of ethylene propylene diene monomer, ethylene propylene copolymer, styrene-ethylene-butylene-styrene, ethylene/octene copolymer and blends thereof, the anhydride grafted elastomer having a grafting level between 0.1-3.0 wt %; and at least 25% by weight one or more polyamides;
  iii. at least 5%, 10%, 20%, 30%, 40% or 50% by weight of the multilayer film being of one or more polyamides; the multilayer film having a haze measured according to ASTM D1003 not higher than 20%, and/or a gloss measured according to ASTM D 2457 of at least 90;
b. forming the film into a tube in a vertical form fill and seal apparatus;
c. filling the tube with a food product; and
d. closing the tube to form a sealed pouch containing the food product.

19. The multilayer film according to claim 1, wherein anhydride grafted elastomer is dispersed through the abuse layer as discrete particles.

* * * * *